(12) United States Patent
Wright et al.

(10) Patent No.: US 9,664,927 B2
(45) Date of Patent: May 30, 2017

(54) CONTACT LENS WITH PEARLESCENT SCLERA

(71) Applicant: Johnson & Johnson Vision Care, Inc., Jacksonville, FL (US)

(72) Inventors: Dawn D. Wright, St. Augustine, FL (US); Angie L. Bowers, Jacksonville, FL (US); Lenora L. Copper, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/230,556

(22) Filed: Mar. 31, 2014

(65) Prior Publication Data

US 2015/0277148 A1    Oct. 1, 2015

(51) Int. Cl.
  *G02C 7/00*   (2006.01)
  *G02C 7/02*   (2006.01)
  *G02C 7/04*   (2006.01)

(52) U.S. Cl.
  CPC ............. *G02C 7/049* (2013.01); *G02C 7/046* (2013.01)

(58) Field of Classification Search
  CPC .......... G02C 7/04; G02C 7/049; G02C 7/083; G02C 7/101; G02C 7/022; G02C 7/021; G02C 7/104; G02C 2202/16; G02C 2202/20; G02C 2202/24; G02C 7/02; G02C 7/046; G02C 7/047; G02C 7/085; G02C 7/048; G02C 11/10; G02C 7/061; G02C 7/081; G02B 1/043; G02B 1/04; G02B 27/0075; G02B 3/14; G02B 27/0037; G02B 5/1895; G02B 1/041; G02B 27/4205; G02B 3/08; G02B 5/18; G02B 5/1828; G02B 1/10; G02B 27/0025; G02B 5/223; G02B 15/00; G02B 1/11; G02B 1/115; G02B 1/118; A61F 2/16; A61F 2/1624;
  (Continued)

(56) References Cited

U.S. PATENT DOCUMENTS 4,495,313 A     1/1985  Larsen
4,652,099 A  *  3/1987  Lichtman ............... G02C 7/046
                                                    351/159.24

(Continued)

FOREIGN PATENT DOCUMENTS

EP          2590007 A1      5/2013
WO       WO0058408 A1     10/2000
(Continued)

OTHER PUBLICATIONS

Madduri V. Rao et al, "Pas Potassium Aluminium Silicate-Based Pearlescent Pigments, Types I, II and III Chemical and Technical Assessment" 2013 [retrieved on Jul. 13, 2015 from http://www.fao.org/fileadmin/user_upload/agns/pdf/CTA_PAS_BPP_77.pdf.

*Primary Examiner* — Scott J Sugarman
*Assistant Examiner* — Sharrief Broome
(74) *Attorney, Agent, or Firm* — Carl J. Evens

(57) ABSTRACT

Pearlescent pigments may be incorporated into one or more regions of a cosmetic contact lens to add a shiny, radiant and iridescent appearance thereto. More particularly, mica based pearlescent pigments coated with an oxide, for example, titanium dioxide or iron oxide, incorporated into one or more regions of the contact lens will result in the one or more regions having a natural, wet reflective appearance.

11 Claims, 8 Drawing Sheets

(58) Field of Classification Search
CPC ...... A61F 2002/1697; A61F 2002/1699; A61F 2/14; A61F 2/1635; A61F 2/1648; A61F 2240/001; A61F 2250/0002; A61F 2/1613; A61F 9/0017; A61F 2210/0076; A61F 2240/004; A61F 2/142; A61F 2/145; A61F 2/1627
USPC ........................................ 351/159.01–159.81
See application file for complete search history.

(56) References Cited

U.S. PATENT DOCUMENTS

| | | | |
|---|---|---|---|
| 4,680,336 | A | 7/1987 | Larsen |
| 6,196,683 | B1 * | 3/2001 | Quinn .................... G02C 7/046 351/159.02 |
| 6,634,747 | B1 | 10/2003 | Atkins |
| 6,811,259 | B2 | 11/2004 | Tucker |
| 6,811,805 | B2 | 11/2004 | Gilliard |
| 6,899,426 | B2 | 5/2005 | Tucker |
| 6,902,274 | B2 | 6/2005 | Tucker |
| 7,011,408 | B2 | 3/2006 | Tucker |
| 7,213,918 | B2 | 5/2007 | Phelan |
| 7,278,736 | B2 | 10/2007 | Ocampo et al. |
| 7,306,333 | B2 | 12/2007 | Tucker et al. |
| 7,354,959 | B2 | 4/2008 | Tucker |
| 7,550,519 | B2 | 6/2009 | Phelan |
| 7,669,946 | B2 | 3/2010 | Tucker |
| 7,713,616 | B2 | 5/2010 | Kuntz |
| 8,147,728 | B2 | 4/2012 | Quinn |
| 8,399,607 | B2 | 3/2013 | April, Jr. |
| 8,524,800 | B2 | 9/2013 | Phelan |
| 8,622,543 | B2 | 1/2014 | Phelan |
| 8,721,945 | B2 | 5/2014 | Phelan |
| 8,770,747 | B2 | 7/2014 | Corti |
| 8,915,591 | B2 | 12/2014 | Corti |
| 8,920,873 | B2 | 12/2014 | Quinn |
| 2003/0085934 | A1 | 5/2003 | Tucker |
| 2005/0076831 | A1 | 4/2005 | Gilliard |
| 2005/0168688 | A1 * | 8/2005 | Doshi ............... B29D 11/00317 351/159.32 |
| 2006/0065138 | A1 | 3/2006 | Tucker |
| 2006/0149017 | A1 * | 7/2006 | Graham ................ C08G 18/10 528/44 |
| 2006/0181676 | A1 | 8/2006 | Tucker et al. |
| 2006/0244908 | A1 | 11/2006 | Cano |
| 2006/0246149 | A1 | 11/2006 | Buchholz |
| 2007/0014744 | A1 | 1/2007 | Swistowski |
| 2007/0032869 | A1 | 2/2007 | Gilliard |
| 2007/0244211 | A1 | 10/2007 | Phelan |
| 2008/0207774 | A1 | 8/2008 | Krishnan |
| 2008/0233062 | A1 | 9/2008 | Krishnan |
| 2008/0292668 | A1 | 11/2008 | Baars |
| 2009/0196842 | A1 | 8/2009 | Zech |
| 2009/0202461 | A1 | 8/2009 | Rodriguez |
| 2010/0047200 | A1 | 2/2010 | Luukas |
| 2010/0056647 | A1 | 3/2010 | Graham |
| 2010/0119461 | A1 | 5/2010 | Bicard-Benhamou |
| 2010/0210745 | A1 * | 8/2010 | McDaniel ............. C09D 5/008 521/55 |
| 2011/0187992 | A1 | 8/2011 | Bowers |
| 2011/0240064 | A1 | 10/2011 | Wales |
| 2011/0250626 | A1 | 10/2011 | Williams |
| 2011/0286947 | A1 | 11/2011 | Luukas |
| 2011/0301247 | A1 | 12/2011 | Hayakawa |
| 2012/0026459 | A1 | 2/2012 | Tucker et al. |
| 2012/0097194 | A1 | 4/2012 | McDaniel |
| 2012/0147319 | A1 * | 6/2012 | Corti ..................... G02C 7/046 351/159.3 |
| 2012/0169993 | A1 * | 7/2012 | Ocampo ................ G02C 7/046 351/159.3 |
| 2012/0177839 | A1 | 7/2012 | Tucker |
| 2013/0107200 | A1 | 5/2013 | Bowers et al. |
| 2013/0168884 | A1 | 7/2013 | Morgan |
| 2013/0175721 | A1 | 7/2013 | Morgan |
| 2013/0272995 | A1 | 10/2013 | Hagiwara |
| 2014/0039086 | A1 | 2/2014 | Phelan |
| 2014/0196631 | A1 | 7/2014 | McDaniel |
| 2014/0271897 | A1 | 9/2014 | Pathak |
| 2014/0328779 | A1 | 11/2014 | Hagiwara |
| 2015/0076721 | A1 | 3/2015 | Quinn |

FOREIGN PATENT DOCUMENTS

| | | | |
|---|---|---|---|
| WO | WO0231585 A1 | 4/2002 | |
| WO | WO 2012/082710 | 6/2012 | |
| WO | WO 2012/144978 A1 | 10/2012 | |
| WO | WO 2012144978 A1 * | 10/2012 | ............ G02C 7/046 |
| WO | WO2012144978 A1 | 10/2012 | |

* cited by examiner

CONTACT LENS WITH PEARLESCENT SCLERA

BACKGROUND OF THE INVENTION

1. Field of the Invention

The present invention relates to ophthalmic lenses, and more particularly to contact lenses incorporating pearlescent pigments in a region that results in a shiny, radiant and iridescent appearance for the sclera.

2. Discussion of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Other cosmetic contact lenses focus on the sclera rather than or in addition to the iris. For example, a contact lens may comprise a brightly colored peripheral portion, i.e. outside of the iris region, that may be opaque, semi-opaque and/or translucent. The bright portion may extend from the edge of the limbus to the edge of the contact lens creating the impression of a brighter or whiter sclera. These contact lenses may include a limbal ring which may make the iris appear larger, darker and/or more defined than it would otherwise. A limbal ring is essentially an annular band of color that, when the lens is on the eye and centered, partially or completely overlies the lens wearer's limbal region which is the junction of the sclera and the cornea.

While the above described cosmetic contact lenses do enhance eye appearance, there exists a need in the cosmetic lens area for lenses comprising effect pigments that result in a shiny, radiant and iridescent appearance.

SUMMARY OF THE INVENTION

The contact lens with a brightly colored sclera, including pearlescent pigments overcomes the issues briefly set forth above.

Cosmetic contact lenses may be designed to alter the appearance of the eyes upon which they are worn in any number of ways, including the color of the entire eye and/or different regions of the eye. While not a requirement, cosmetic contact lenses may also be utilized to correct refractive error. Cosmetic contact lenses may also have a direct medical application. For example, cosmetic contact lenses may be utilized to restore the appearance of a damaged eye. Cosmetic contact lenses may include transparent, translucent, opaque-color enhancements or tints. Tints may include organic/inorganic pigments, dyes or special effect pigments. Printed regions on the contact lens may include the iris region (iris patterns), the limbal region (limbal rings), the scleral region (sclera brightening), or any combination thereof. In addition, patterns may be continuous, intermittent or any combination thereof.

The cosmetic contact lenses of the present invention may comprise any of the above described lenses with the incorporation of pearlescent pigments to add a shiny, radiant and iridescent appearance to a wearer's eyes. The pigments may be added to any region of the lens, but is preferably added to the region overlying the sclera. The combination or incorporation of pearlescent pigments will result in a brighter white sclera region that has a wet reflective appearance and which also looks natural.

The incorporation of pearlescent pigments does not have any significant impact on the cosmetic contact lens manufacturing process; accordingly, a natural and shiny appearance may be achieved without significant changes.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Figure 1:
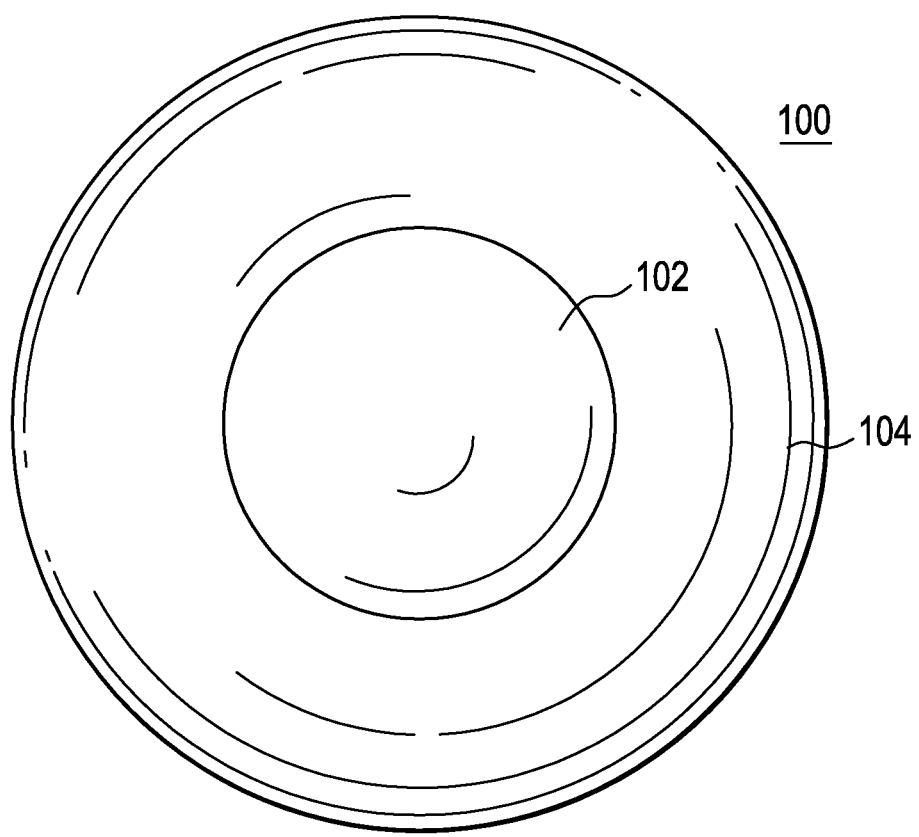
FIG. 1 is a plan view of an exemplary non-cosmetic contact lens.

Referring now to FIG. 1, there is illustrated a plan view of an exemplary non-cosmetic contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction may be obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

The lens 100 illustrated in FIG. 1 is circular, but may be any convenient shape for a contact lens, such as an elliptical or truncated circular shape. In addition to being round or non-round, the contact lens 100 may be planar or non-planar.

A cosmetic contact lens is designed to enhance or alter the appearance of the eye upon which it is worn. While not a requirement, cosmetic contact lenses may also be utilized for the correction of refractive error. In addition, cosmetic contact lenses may also have direct medical application, for example, to restore the appearance of a damaged eye. Individuals who suffer from aniridia, the absence of an iris, or dyscoria, damage of the iris, may utilize colored contact lenses that will give the appearance of a complete iris. Cosmetic contact lenses may include translucent/transparent color enhancement, tint, opaque color tint, artificial iris patterns, limbal rings, sclera brightening tints and/or any combination of the above.

Figure 2:
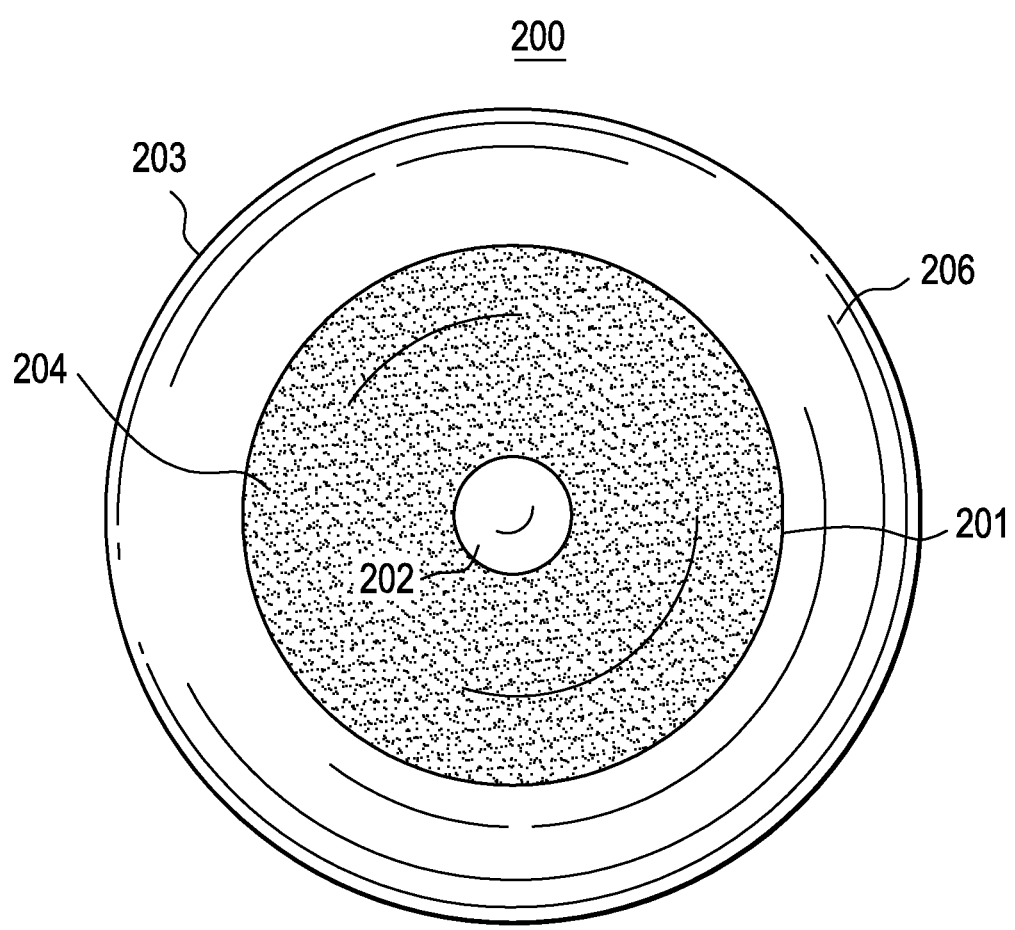
FIG. 2 is a plan view of a first exemplary cosmetic contact lens.

Referring to FIG. 2, there is illustrated a first exemplary cosmetic contact lens 200. While this lens 200 comprises an optic zone and a peripheral zone within the meaning set forth above with respect to the contact lens 100 of FIG. 1, different terms are utilized to describe the various regions of a cosmetic contact lens. The cosmetic contact lens 200 comprises a center region 202 that is sized to substantially correspond to the size and location of an individual pupil. The center region 202 typically has no coloring or design so as not to interfere with visual acuity. A central portion 204 surrounds the center region 202 and is sized to substantially correspond to the size and location of an individual's iris. The central portion 204 may comprise one or more colors and/or a pattern formed by one or more colors to enhance the appearance of the wearer's iris. Disposed about the central portion 204 and extending to the surrounding edge of the contact lens 200 is a peripheral portion 206. The peripheral portion 206 comprises an annular shape with an inner diameter measured from point 201 and an outer diameter measured from point 203 which may, but need not necessarily coincide with the outer edge of the contact lens 200 as a whole. The peripheral portion 206 may be colored with a bright color, for example, white, near white, off white, light yellow, pale blue, light pink, light green or any combination of the above. The bright colors are disposed so as to blend gradually with the wearer's sclera.

The peripheral portion 206 is colored to enhance the appearance of the sclera. The coloring of the peripheral portion 206 may be opaque, translucent, or somewhere between the two, or semi-opaque. Exemplary embodiments enhance the appearance of the sclera by providing the sclera with a refreshed, natural appearance. Opaque as utilized herein shall be understood to mean a color that permits an average light transmittance in the 380 to 780 nm range of 0 to about 50 percent, and preferably 7 to about 50 percent. Translucent as utilized herein shall be understood to mean a color that permits an average light transmittance in the 380 to 780 nm range of about 50 to about 85 percent, and preferably from about 65 to about 85 percent.

Figure 3:
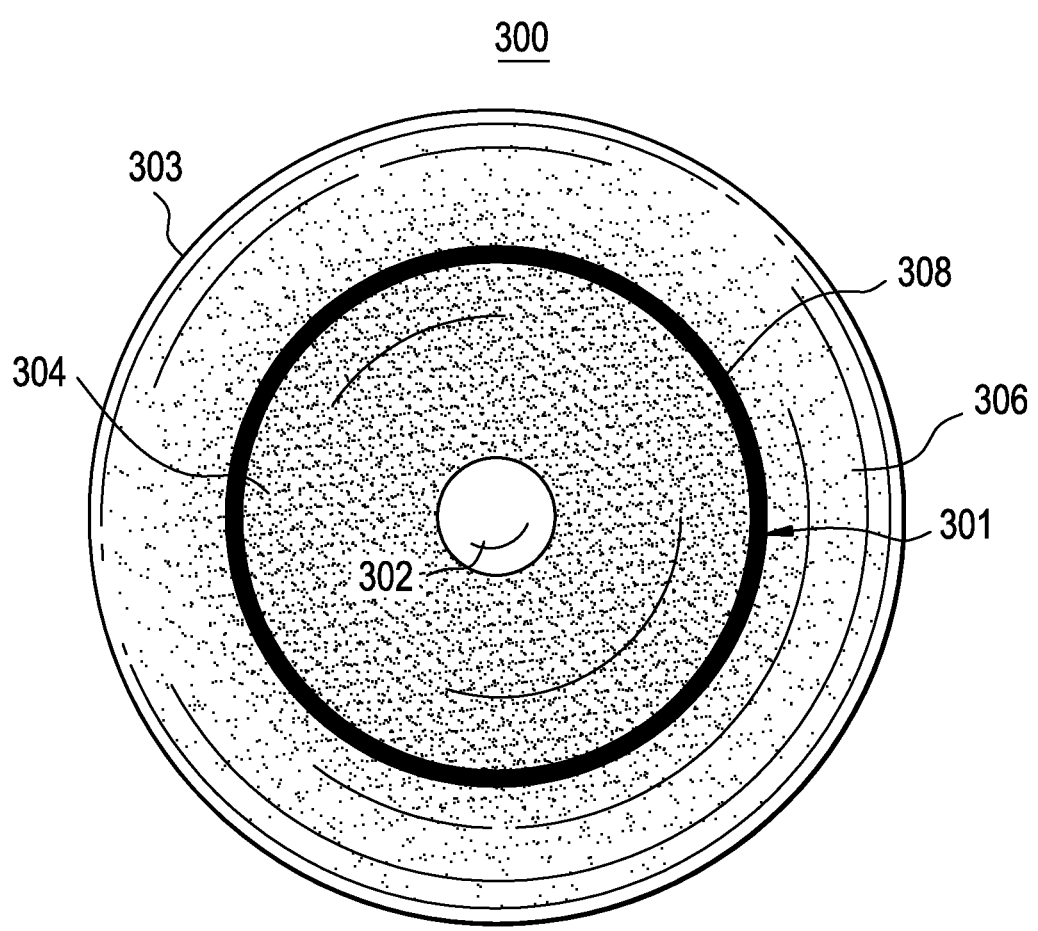
FIG. 3 is a plan view of a second exemplary cosmetic contact lens.

FIG. 3 illustrates a second exemplary cosmetic contact lens 300. The cosmetic contact lens 300 comprises a center region 302, a central portion 304 that surrounds the center region 302, a peripheral portion 306 that surrounds the central portion 304 and a limbal ring 308. As set forth herein, a limbal ring is essentially an annular band of color that, when the lens is on the eye and centered, partially or completely overlies the lens wearer's limbal region. In some exemplary embodiments, a limbal ring may be larger to create a halo effect. In this exemplary embodiment, the coloring in the peripheral portion 306 is or may be graduated from opaque to translucent or transparent from the inner diameter measured from point 301 to the outer diameter measured from point 303. As in the previously described exemplary embodiment, the central portion 304 may comprise one or more colors and/or a pattern formed by one or more colors to enhance the appearance of the wearer's iris. This combination provides the most natural iris along with the contrast of a dark limbal ring, while providing the additional benefit of a bright coloring applied in the peripheral portion 306. The limbal ring 308 may be of any suitable width or pattern that allows the ring 308 to blend naturally with the iris, the central portion coloring/pattern 304 and the bright colored peripheral portion 306. The limbal ring 308 may be translucent or opaque.

Figure 4:
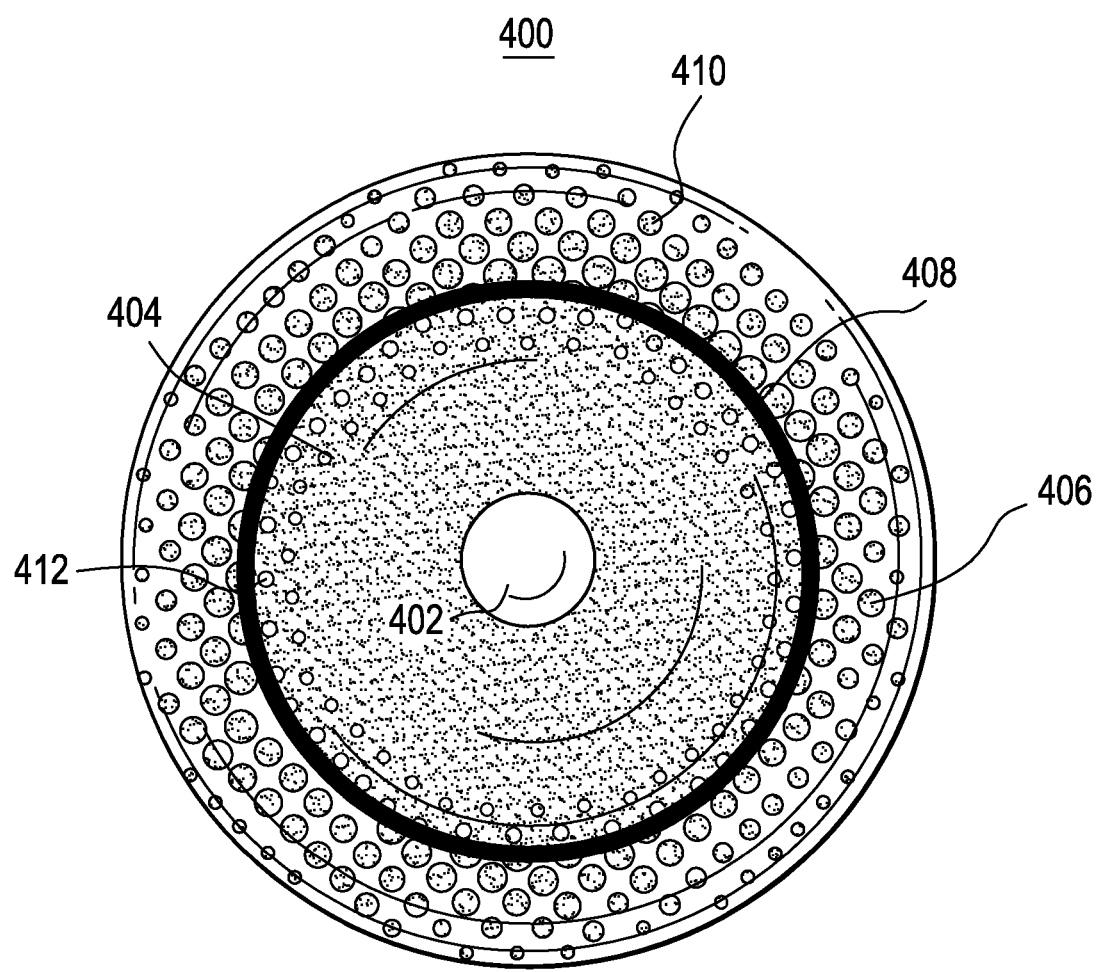
FIG. 4 is a plan view of a third exemplary cosmetic contact lens.

FIG. 4 illustrates a third exemplary cosmetic contact lens 400 with a bright coloring in the peripheral portion 406 applied in the form of a geometric pattern. The cosmetic contact lens 400 comprises a center region 402, a central portion 404 that surrounds the center region 402, the peripheral portion 406 that surrounds the central portion 404 and a limbal ring 408. The difference between the contact lens of FIGS. 3 and 4 lies in the geometric pattern in the peripheral portion 406. In this exemplary cosmetic lens 400, the geometric pattern takes on the appearance of circles 410 removed from the lens surface that would otherwise be colored white, so that each circle 410 touches its neighboring circle 410 at a tangent. While this exemplary embodiment utilizes circles 410 as the geometric shape, it is important to note that any geometric shape may be utilized. It may also be thought of as rows and columns of cross shaped brightly colored structures formed by the circles 410. As illustrated, circles 412 may also extend into the pattern in the central portion 404.

Figure 5:
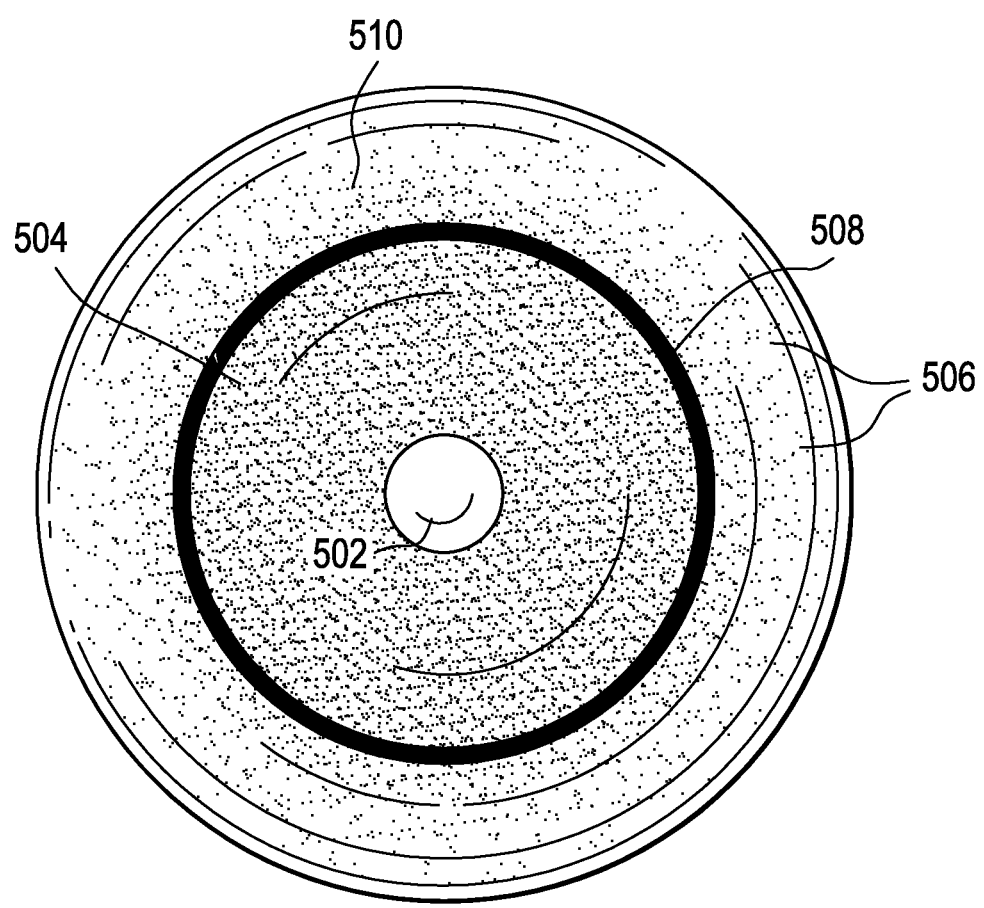
FIG. 5 is a plan view of a fourth exemplary cosmetic contact lens.

Patterning comprising geometric shapes may be formed from regularly shaped structures as described above with respect to FIG. 4, or from a plurality of random dots or shapes 510 which are in both the central portion 504 and the peripheral portion 506 of a cosmetic contact lens 500 as illustrated in FIG. 5. The central region 502 and the limbal ring 508 do not have patterns in this exemplary contact lens 500, for example, no spokes or blending. Any convenient shapes for conveying a realistic or enhanced sense of color may be utilized, particularly, where such geometric shapes contribute to a desired hue or shade. The dots utilized may comprise any size and shape. Dots aid in blending of the boarders of the different elements of the cosmetic contact lenses.

In any of the patterns of the cosmetic contact lenses set forth herein, the center preferably is clear. However, the center region may be an area of translucent/transparent or opaque color or any combination of opaque and translucent/transparent colors.

As used in a contact lens for either enhancing or altering the wearer's eye color, preferably the limbal ring element is a solid band of color that masks the color of the lens wearer's limbal region and more preferably, the masking color is an opaque color. Once again, limbal rings, sized appropriately, may be utilized to create a halo effect. The remaining elements, the spokes, dots and other pattern elements may be translucent or opaque depending on the desired cosmetic on-eye result.

The color selected for each of the limbal ring and iris pattern elements will be determined by the natural color of the lens wearer's iris and the enhancement or color change desired. Thus, elements may be any color, including any of a variety of hues and chromas of blue, green, gray, brown, black, yellow, red, or combinations thereof. Preferred colors for the limbal ring include any of the various hues and chromas of black, brown, gray, dark blue and dark green.

The brightly colored element comprising the peripheral portion may be pure white, near white, off white, light yellow, pale blue, light pink, light green, or any combination of the above. Preferably, it is matched so that it does not starkly contrast with the visible portion of the sclera that is not covered by the lens. These colors are preferably obtained by use of $TiO_2$ with higher amounts yielding greater opacity and contrast. The addition of pigments include iron oxide black, iron oxide brown, iron oxide yellow, iron oxide red, titanium dioxide, and the like, and combinations thereof, in small amounts to adjust the whiter colored element. In addition to these pigments, soluble and non-soluble dyes may be used, including dichlorotriazine and vinyl sulfone-based dyes. One exemplary embodiment being a colorant with 10 percent to 20 percent $TiO_2$ and 80 percent to 90 percent clear binding polymer to provide appropriate translucency.

In general, the colored elements may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include pthalocyanine blue, pthalocyanine green, carbazole violet, vat orange #1, and the like as well as combinations thereof. Examples of useful inorganic pigments include iron oxide black, iron oxide brown, iron oxide yellow, iron oxide red, titanium dioxide, and the like, as well as combinations thereof. In addition to these pigments, soluble and non-soluble dyes may be used, including dichlorotriazine and vinyl sulfone-based dyes. Useful dyes and pigments are commercially available.

In accordance with a preferred exemplary embodiment, pearlescent pigments may be incorporated into one or more regions or portions of a cosmetic contact lens to add a shiny, radiant and iridescent appearance thereto. More preferably, these pearlescent pigments are added to at least a portion of the lens corresponding to the wearer's sclera. A pearl luster and interference effect results from alternating layers of transparent materials with different refractive indices. Pearlescent pigments may be combined with other pearlescent pigments and/or in combination with different types of pigments, for example, iron oxides, phthalocyanimes and titanium dioxide, or dyes. Some of the resulting colors may be silver, gold and various shades of red, blue and green.

In general, the currently utilized preferred pigment for creating a brightly colored sclera region on a cosmetic contact lens is titanium dioxide. The cosmetic contact lenses in accordance with the preferred embodiments of the present invention incorporate pearlescent pigments into regions corresponding to a wearer's sclera thereby creating a shiny, radiant and iridescent appearance. In other words, the combination or incorporation of pearlescent pigments, for example mica based pearlescent pigments coated with titanium dioxide will result in a brighter white sclera region that has a wet reflective appearance and which also looks natural. The preferred pearlescent pigment is a silver type that is a mica based pigment coated with titanium dioxide. An exemplary mica based pigment is potassium aluminum silicate, which may be coated with titanium dioxide, $TiO_2$, or iron oxide, $Fe_2O_3$. EMD Chemicals Inc. offers a food and drug approved natural silicate combined with titanium dioxide under the trademark Candurin®. It is important to note; however, that any pearlescent pigment may be combined with other pearlescent pigments and/or in combination with different types of pigments or dyes and utilized in the sclera region.

The cosmetic contact lenses of the present invention incorporating pearlescent pigments may include a limbal ring, a pattern that overlies the wearer's iris, a pattern that overlies the pupil region, a clear pupil region, a brightly colored sclera region, a brightly colored sclera region with a geometric pattern and/or any combination thereof. The limbal ring is preferably opaque or translucent. The iris area may be translucent, opaque or transparent. The pupil region is transparent or contains no pattern. Both pigments and dyes may be utilized to color the pattern elements of the limbal, iris and pupil regions of the contact lens. Any organic pigment, inorganic pigment, effect pigment, dye or any combination thereof may be utilized to color the elements of the patterns.

Figure 6:
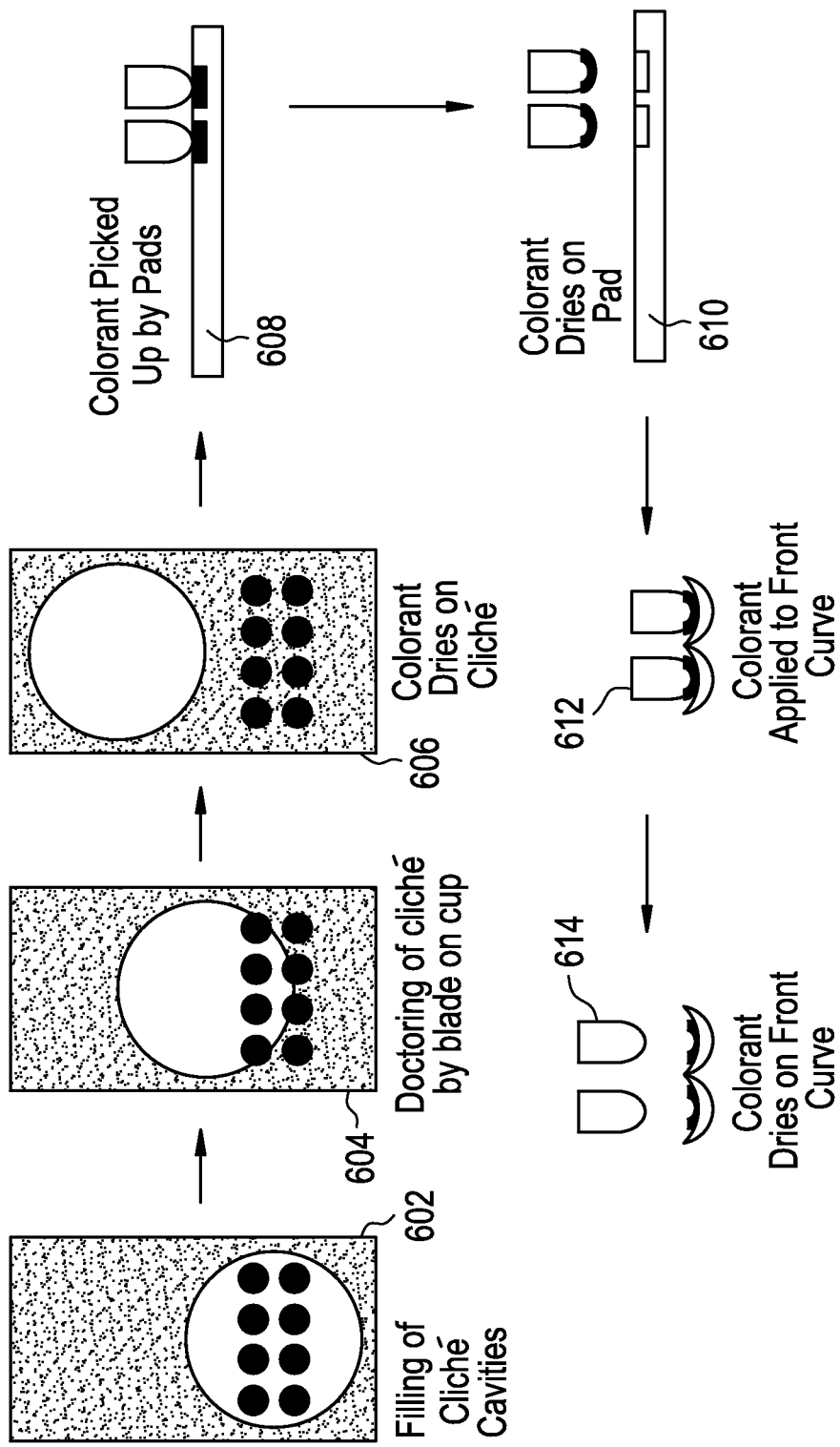
FIG. 6 is a diagrammatic representation of a generalized pad printing process.
Figure 7:
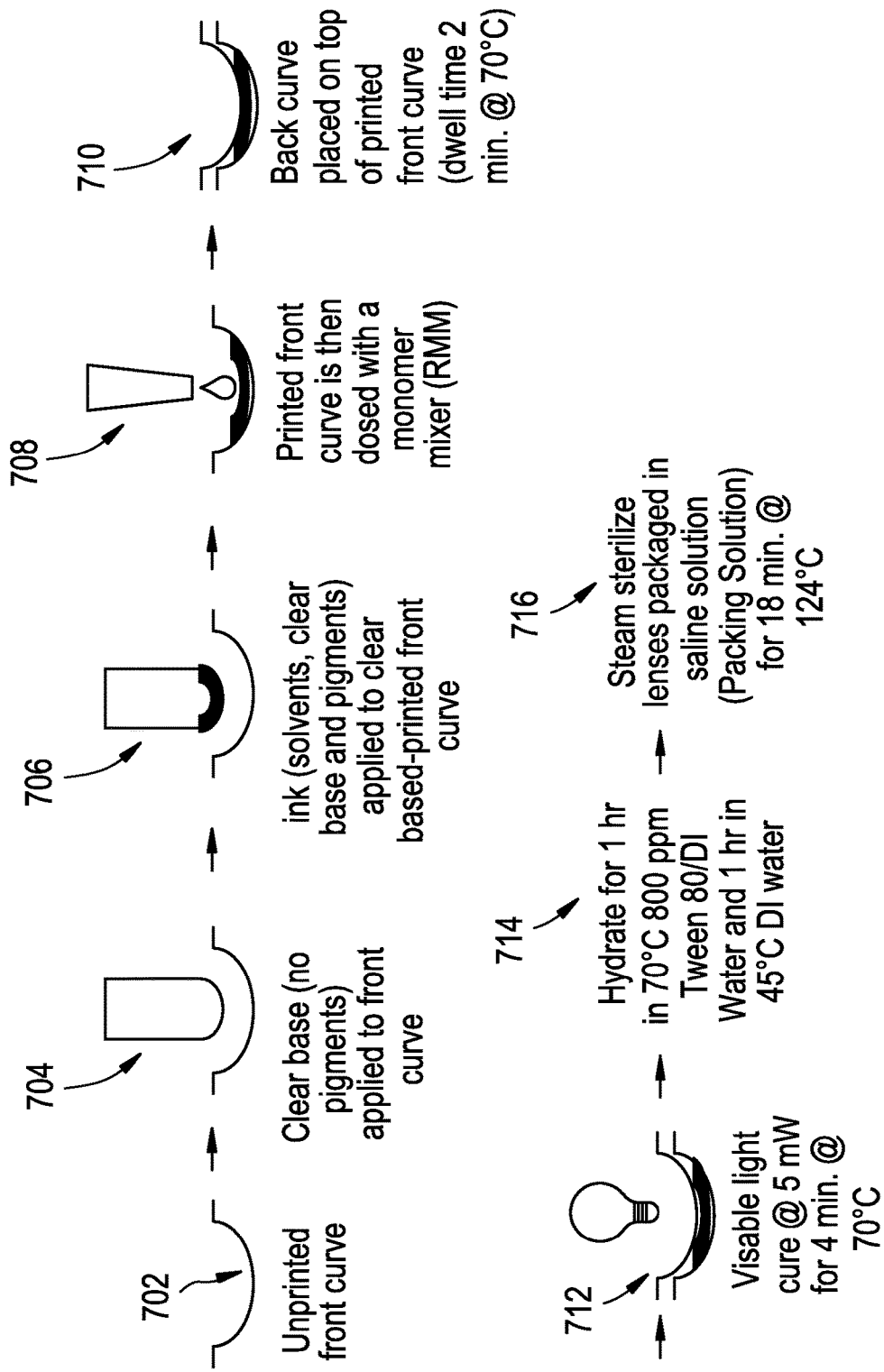
FIG. 7 is a diagrammatic representation of a more detailed pad printing process.

The designs/patterns/colors for the different regions of a cosmetic contact lens are developed based upon market research. These patterns are then etched into metal structures generally referred to as a cliché. Once the clichés are fabricated, a multi-step process is utilized to manufacture the cosmetic contact lens as described below. FIG. 6 illustrates a general overview of the pad printing process utilized in the manufacturing process. The first step, 602, in the process is filing of the cliché cavities with the desired colorant. The second step, 604, in the process involves the removal of excess ink from the surface of the clichés. Excess ink is typically removed from the surface of the clichés through the use of a doctoring blade or doctoring blades. In the third step, 606, of the process, the colorant is dried on the clichés. In the fourth step, 608, of the process, the colorant in the cliché's is picked up by pads. In the fifth step, 610, of the process, the colorant is dried or is allowed to dry on the pads. In the sixth step, 612, of the process, the colorant is transferred from the pads to the front curve surface wherein additional processing is performed as described below. In the seventh step, 614, of the process, the colorant is dried or is allowed to dry on the front curve surface of the front curve mold half. FIG. 7 provides a more detailed process description. In the first step, 702, an unprinted front curve mold for the contact lens is provided. In the second step, 704, a clear base, i.e. no pigment or dyes is applied to the front curve. In the third step, 706, ink, including solvents, clear base and pigments is applied to the clear base printed front curve. In the fourth step 708, the printed front curve is then dosed with a reactive monomer mixture, for example, etafilcon-A. In the fifth step, 710, of the process, the back curve mold for the contact lens is positioned on the front curve mold where it remains for two (2) minutes while the temperature is maintained at seventy (70) degrees C. In the sixth step, 712, of the process, the reactive monomer mixture between the front and back curve is exposed to visible light for curing. This curing step utilizes visible light at five (5) mW for four (4) minutes at a temperature of seventy (70) degrees C. In the seventh step, 714, of the process the contact lens from the mold is hydrated for one (1) hour in seventy (70) degrees C. solution of 800 ppm Tween 80 and de-ionized water and for an additional one (1) hour in forty-five (45) degree C. de-ionized water. In the eighth step, 716, of the process, the contact lens is steam sterilized in its own packaged saline solution for eighteen (18) minutes at a temperature of one hundred twenty-four (124) degree C. It is important to note that the above-described process has been simplified for ease of explanation.

Figure 8:
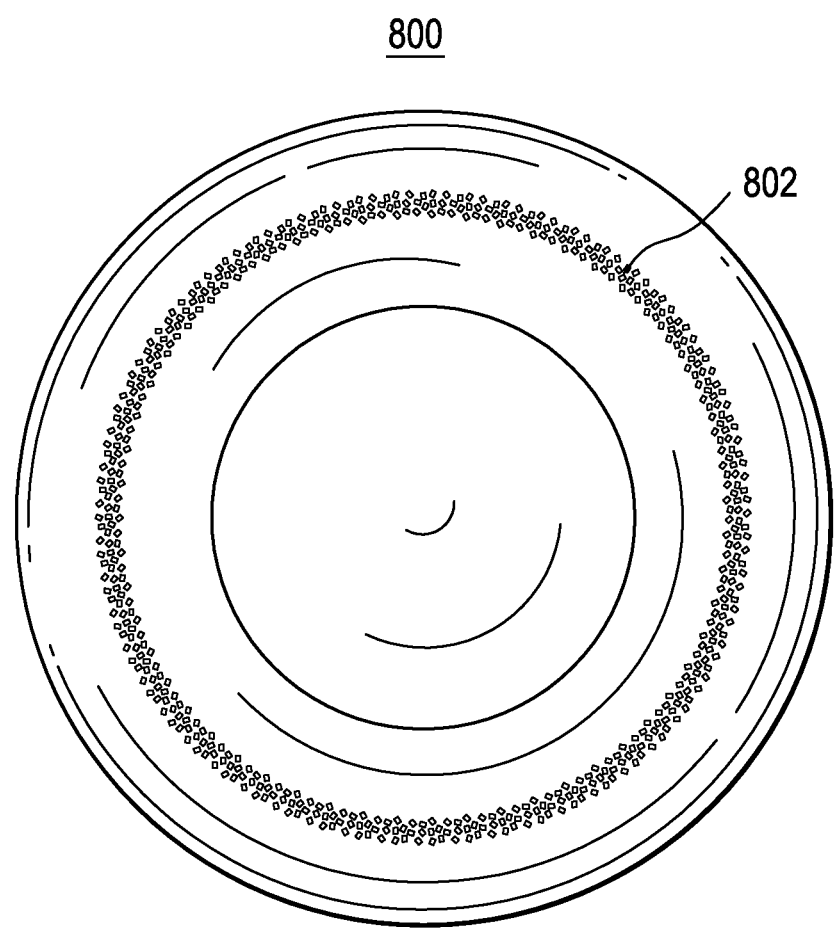
FIG. 8 is a diagrammatic representation of a cosmetic contact lens with a brightly colored sclera with pearlescent pigments in accordance with the present invention.

Referring now to FIG. 8, there is a diagrammatic illustration of a cosmetic contact lens 800 with a brightly colored sclera region 802 formed from mixture comprising pearlescent pigments in accordance with the present invention. The brightly colored sclera region 802 with pearlescent pigments may be manufactured as follows. A clear base ink was prepared by adding 35.35 g of 1-propanol to 588.11 g of 1D Clear Base. A more detailed description of the clear base ink composition as well as its preparation is given below. The ink sample was then mixed for three (3) minutes at 1800 rpm on a Servodyne mixer. A twenty (20) percent Silver Fine ink was prepared by adding 5.98 g of 1-propanol to 20.05 g Silver Fine pigments (EMD Cemicals, Candurian® Pearl Effect Colors) and 80.01 g of 1D Clear Base. The mixture was then hand mixed. Steel clichés with etched patterns were filled with the ink mixtures and printed onto the surface of a mold as described above. The ink was transferred from the clichés to the surface of a mold using a silicon pad. The clear base ink was printed first followed by the Silver Fine ink. A lens forming material; namely, etafilcon A reactive monomer mixture, was deposited onto the printed mold and a complementary mold half was then utilized to complete the mold assembly. The lens material was then cured, released from the mold and equilibrated in a buffered saline solution, all as described in more detail above. The pearlescent pigments are encapsulated within the lens material.

A binding polymer for the clear base ink was made using 96 g of 1-dodecanethiol (DODT), 56.54 g lauryl methacrylate (LMA), 7.40 g methacrylic acid (MAA), 1367 g of hydroxyethylmethacrylate (HEMA), 68.5 g glycerol, 378 g 1-ethoxy-2-propanol (EP), 1511 g isopropyl lactate (IPL) and 8.89 g 2,2'-azobis(2-methylbutyronitrile) (AMBN). First adding the DODT, monomers and solvents, except for about 50-100 cc of the IPL, were mixed in a five (5) liter blue cap bottle and stirred for ten (10) minutes. The mixture was then poured into a five (5) liter stainless steel reactor with stirrer and nitrogen. The mixture was stirred and heated for approximately twenty-five (25) minutes until the temperature was sixty-eight (68) degrees C. After the temperature was stabilized at sixty-eight (68) degrees C., the AMBN was dissolved in the remaining IPL and added while opening the nitrogen bleed. The polymerization was allowed to proceed for 16-24 hours after which the temperature was increased to eighty (80) degrees C. and the reaction was completed. The mixture was then allowed to equilibrate to room temperature. The viscosity of the mixture was adjusted as desired by mixing four (4) parts of IPL with one (1) part of EP.

As set forth above, the lens forming material comprises etafilcon A. Etafilcon A is a well-known and patented material for manufacturing contact lenses. Etafilcon A is a copolymer of 2-hydroxyethal methacrylate and methacrylic acid cross-linked with 1,1,1-trimethyol propope trimethacrylate and ethylene glycol dimethacrylate. Etafilcon A is utilized in a number of contact lenses available from VISTAKON® a division of Johnson & Johnson Vision Care, Inc. It is important to note that while etafilcon A is utilized in the exemplary embodiments described herein, any suitable lens forming material may be utilized.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:
1. A contact lens, the contact lens comprising:
a clear pupil section in the center of the lens and designed to overly a wearer's pupil;
a first region corresponding to and designed to overly the scleral portion of a wearer's eye, the first region including a bright color incorporated therein;

a second region corresponding to and designed to overly the iris portion of a wearer's eye, the second region being inside of the first region, surrounding the clear pupil, and having an annular shape; and mica based pearlescent pigments incorporated solely in the first region which overlays the scleral portion of the wearer's eye, the mica based pigments in combination with the bright color giving that region a shiny, radiant and iridescent appearance, the mica based pearlescent pigments being encapsulated within the material forming the lens.

2. The contact lens according to claim 1, wherein the mica based pearlescent pigment are coated with an oxide layer.

3. The contact lens according to claim 2, wherein the oxide layer comprises titanium dioxide.

4. The contact lens according to claim 2, wherein the oxide layer comprises iron oxide.

5. The contact lens according to claim 1, wherein the mica based pearlescent pigments comprise potassium aluminum silicate.

6. The contact lens according to claim 1, wherein the mica based pearlescent pigments are arranged in a random pattern.

7. The contact lens according to claim 1, wherein the mica based pearlescent pigments are arranged in a non-random pattern.

8. The contact lens according to claim 1, wherein the mica based pearlescent pigments encapsulated with the first region.

9. The contact lens according to claim 1, further comprising one or more non-mica based pearlescent pigments to be combined with the mica based pearlescent pigments.

10. The contact lens according to claim 1, further comprising one or more non-pearlescent pigments to be combined with the mica based pearlescent pigments.

11. The contact lens according to claim 1, further comprising one or more dyes to be combined with the mica based pearlescent pigments.

* * * * *